United States Patent [19]
Rooklyn

[11] 4,363,587
[45] Dec. 14, 1982

[54] BENCH WITH SELF-LEVELING PRODUCTION CART

[76] Inventor: Jack Rooklyn, 4121 Vanowen Pl., Burbank, Calif. 91505

[21] Appl. No.: 264,084

[22] Filed: May 18, 1981

Related U.S. Application Data

[63] Continuation of Ser. No. 48,346, Jun. 14, 1979, abandoned.

[51] Int. Cl.$^3$ .............................................. B65G 69/24
[52] U.S. Cl. ....................................... 414/401; 108/64
[58] Field of Search ...................... 414/396, 401, 584; 108/64, 90; 186/62, 63, 64, 65, 47; 312/195, 250; 308/3 R, 3.6, 3.8, 6 R

[56] References Cited

U.S. PATENT DOCUMENTS

| | | | |
|---|---|---|---|
| 1,896,883 | 2/1933 | Callison | 414/584 X |
| 2,711,835 | 6/1955 | Kappen | 414/401 |
| 4,105,096 | 8/1978 | Baugh et al. | 186/63 |

FOREIGN PATENT DOCUMENTS

| | | | |
|---|---|---|---|
| 581611 | 9/1958 | Italy | 414/401 |
| 901524 | 7/1962 | United Kingdom | 414/401 |
| 910538 | 11/1962 | United Kingdom | 414/401 |

*Primary Examiner*—Robert G. Sheridan
*Attorney, Agent, or Firm*—Herzig & Walsh, Inc.

[57] ABSTRACT

A production workbench is associated with a production cart which is mounted on castors to be movable from one work station to another. In a preferred form, the bench is provided with a slot or cutout to receive the production cart. Inter-engaging guide track apparatus and rollers are provided between the bench and the cart operative to serve as self-leveling apparatus to bring the surfaces of the bench and the cart to the same level when the production cart is inserted into the cutout.

13 Claims, 6 Drawing Figures

FIG. 5
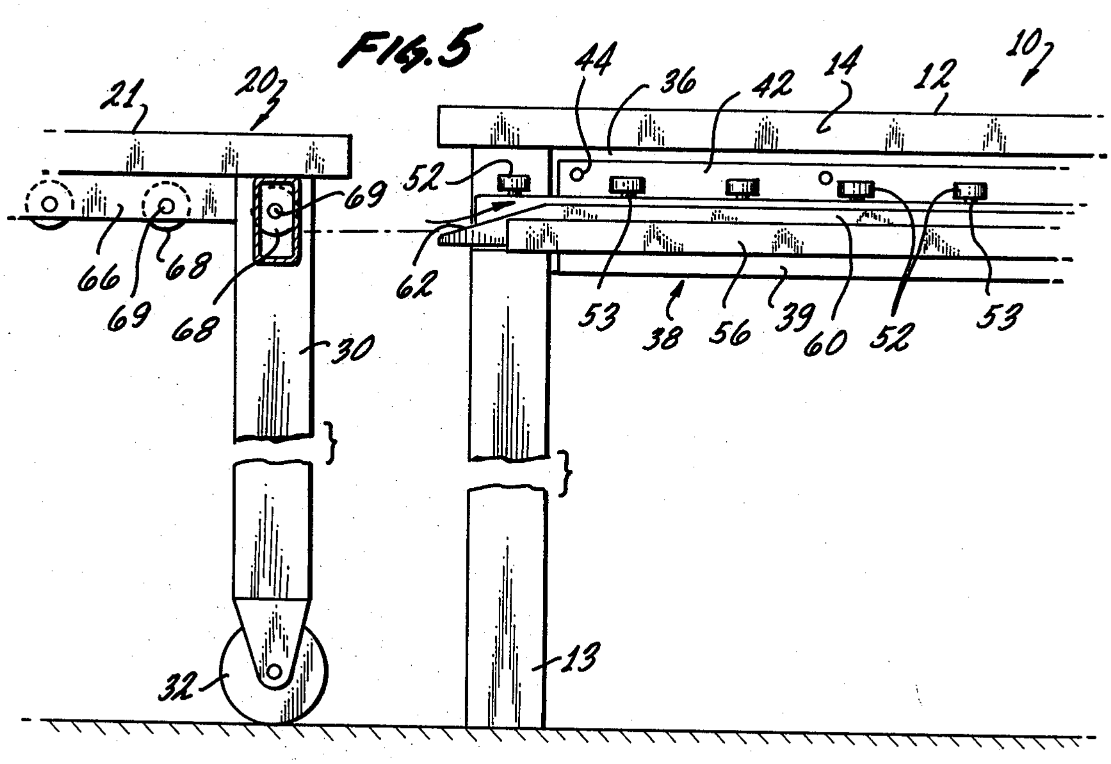
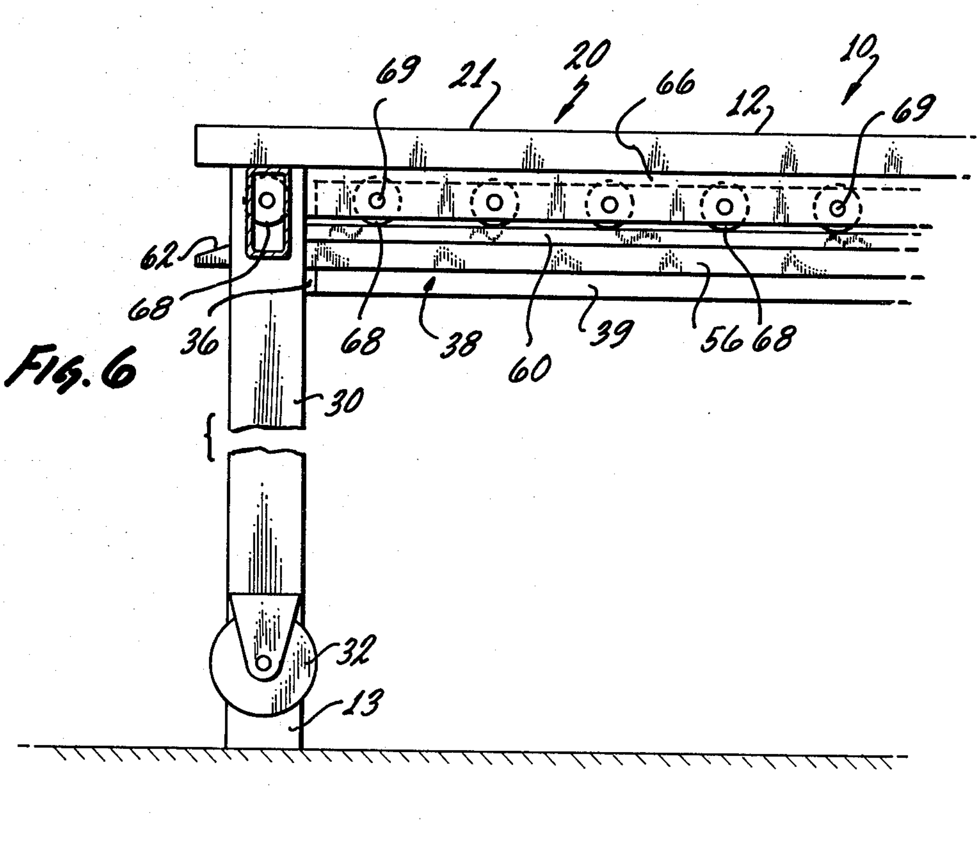
FIG. 6

BENCH WITH SELF-LEVELING PRODUCTION CART

This is a continuation of application Ser. No. 06/048,346 filed on June 14, 1979, now abandoned.

BACKGROUND OF THE INVENTION

1. Field of the Invention

The field of the invention is that of production workbenches, such as utilized in factories or production areas. The invention is particularly concerned with such benches in association with production carts which are mounted on wheels and are utilized in association with the fixed benches.

2. Description of the Prior Art

Fixed production workbenches are, of course, known in the prior art as are wheeled, or production carts which are movable from one work station to another to accommodate movement of material being worked on from one position to another. A difficulty in the prior art has been that when production is moved from one fixed bench to another on a cart, because of unevenness in the floor, its working surface or platform will not be at the same level as that of the fixed bench. This imposes difficulties, particularly in connection with moving delicate pieces or parts about on the surface while on surfaces not flush with each other. The herein invention as described in detail hereinafter overcomes this deficiency of the prior art and provides related improvements.

SUMMARY OF THE INVENTION

The foregoing identifies a preferred embodiment of the invention which is described in detail hereinafter and which has currently been determined to be the best mode of practicing the invention.

In the preferred embodiment, a fixed workbench or table is provided with a slot or cutout in an intermediate part of the surface thereof. A production cart mounted on wheels, preferably castors, is provided having a working surface or platform of a size to fit into the cutout in the fixed bench. The production cart is movable from one work station to another for the purpose of transporting parts between work stations.

The production cart can be moved to have its surface fitted into the slot or cutout in the fixed bench. Guide tracks are provided at the sides of the slot in the fixed bench.

The top surface or platform of the production cart is provided with roller means which can engage with the guide tracks, interengagement being such as to slightly lift the production cart to bring its surface level with the surface of the production bench so that the production cart is stabilized in position with the working surfaces flush.

In the light of the foregoing, the primary object of the invention is to realize an improved arrangement as between a fixed work or production bench and a production cart which is mounted on wheels whereby the production cart can be brought into a stabilized position in juxtaposed relation to the production bench with the surfaces of the production cart and the fixed bench at the same level.

Another object is to realize improvements as in the foregoing wherein the fixed bench is provided with guide tracks, the production cart having roller means interengageable with the guide tracks in a manner to bring the surface of the production cart into a stabilized position with its surface at the same level as that of the production bench.

Further objects and additional advantages of the invention will become apparent from the following detailed description and annexed drawings.

BRIEF DESCRIPTION OF THE DRAWINGS

FIG. 5 is an illustrative view illustrating the interengagement, between rollers on the production cart and guide tracks on the production bench; and FIG. 6 is a view similar to that of FIG. 5 illustrating the production cart moved into position with respect to the fixed bench.

DESCRIPTION OF THE PREFERRED EMBODIMENT AND BEST MODE

Figure 1:
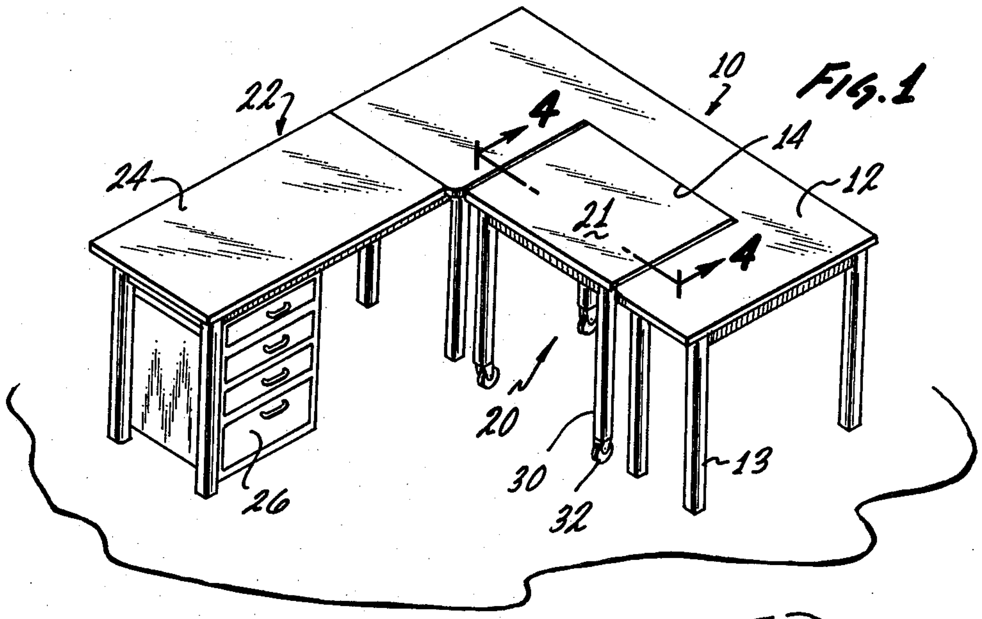
FIG. 1 is a pictorial view of a preferred form of the invention.

Referring to FIG. 1 of the drawings, numeral 10 designates a fixed bench having a flat working surface 12 and having legs, one of which is designated by the numeral 13. The top surface 12 has a rectilinear cutout as designated at 14 adapted to receive a production cart designated by the numeral 20.

As shown, the workbench has a side wing part as designated at 22, this part having a flat surface at the same level as the surface 12, the side wing part having legs similar to the legs of the part 10. Shown in the side part 20 is a group of slide drawers as designated by the numeral 26.

The production cart 20 has four corner legs, one of which is designated at 30 and having a fitting including a castor wheel 32 at its lower end. The four legs are alike so they need not be described in further detail.

Mounted underneath the top 12 of the bench 10 adjacent to the side edges of the cutout 14 are beam or frame members as designated at 36 and 36' in the Figures. Referring to the member 36, attached to its inside surface is a frame support member 38 of angular configuration as shown. The member 38 has a bottom flange 39 which is secured to the frame member 36 by screws, such as shown at 40. The member 38 has an upper longitudinal flange 42 which is spaced from the member 36. Extending between the flange 42 and the side wall of member 36 are bolts as shown at 44 with coil springs, such as shown at 46, in between the flange and the wall of the member 36. The purpose of this construction will be described presently. The member 38 has a flat horizontal surface part 50, and carried on this part is a series of rollers as shown at 52, each being mounted on a stem as designated at 53 for purposes as will be described presently.

Secured to the outer wall of the member 38 is a U-channel member as designated at 56, the channel member 56 being secured by bolts. The channel member 56 carries an elongated track member 60 as may be seen in FIG. 2 which at one end shown at 62 has a bevelled part forming a ramp for purposes as will be described.

The guide track assembly at the other side of the cutout 14 is like the one just described, it being a mirror image so it need not be described in further detail.

Figure 2:
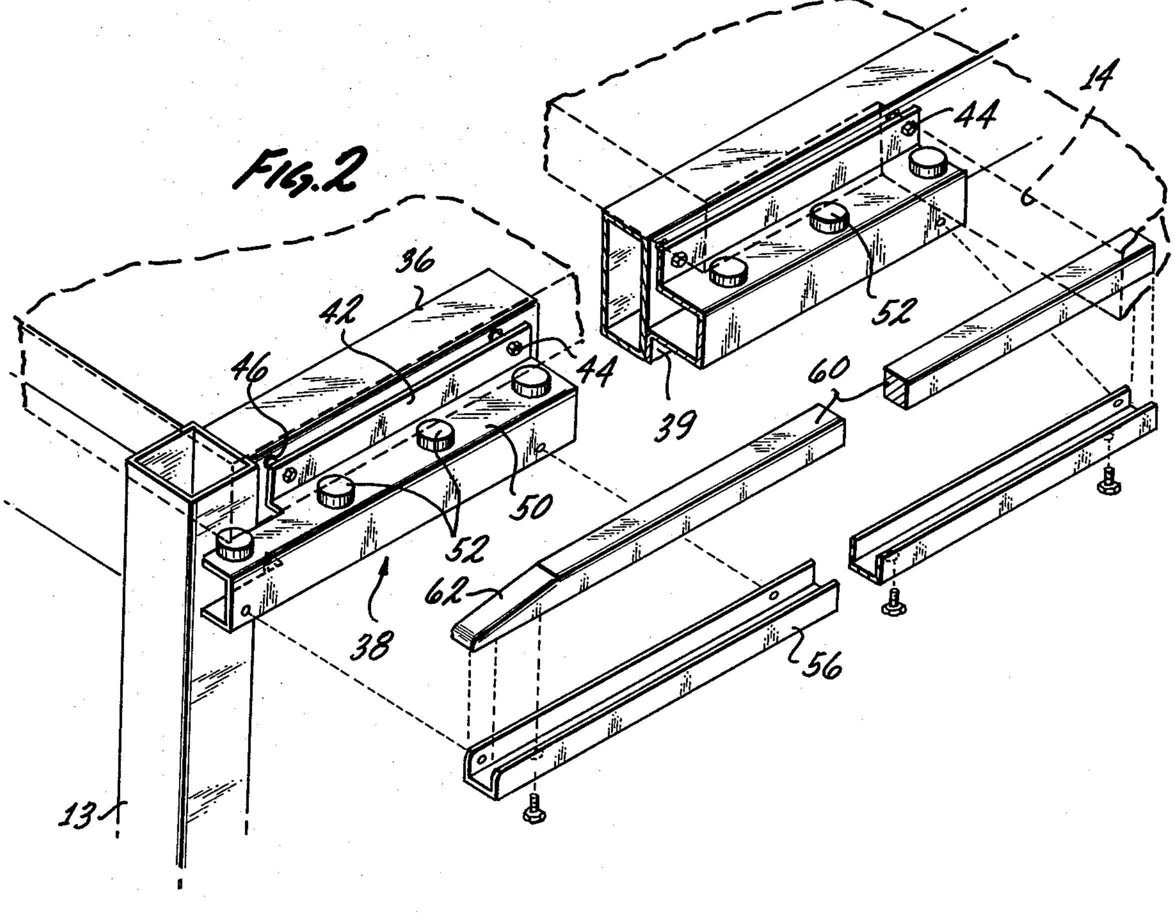
FIG. 2 is an isometric exploded view illustrating the guide tracks carried by the fixed bench.

FIG. 2 illustrates the relationship of the parts as described in connection with FIG. 3 to the surface of the fixed bench. As may be seen, a guide track assembly is provided, the elongated member 60 providing a guide track which is adjacent to the series of rollers 52.

Figures 3, 4:
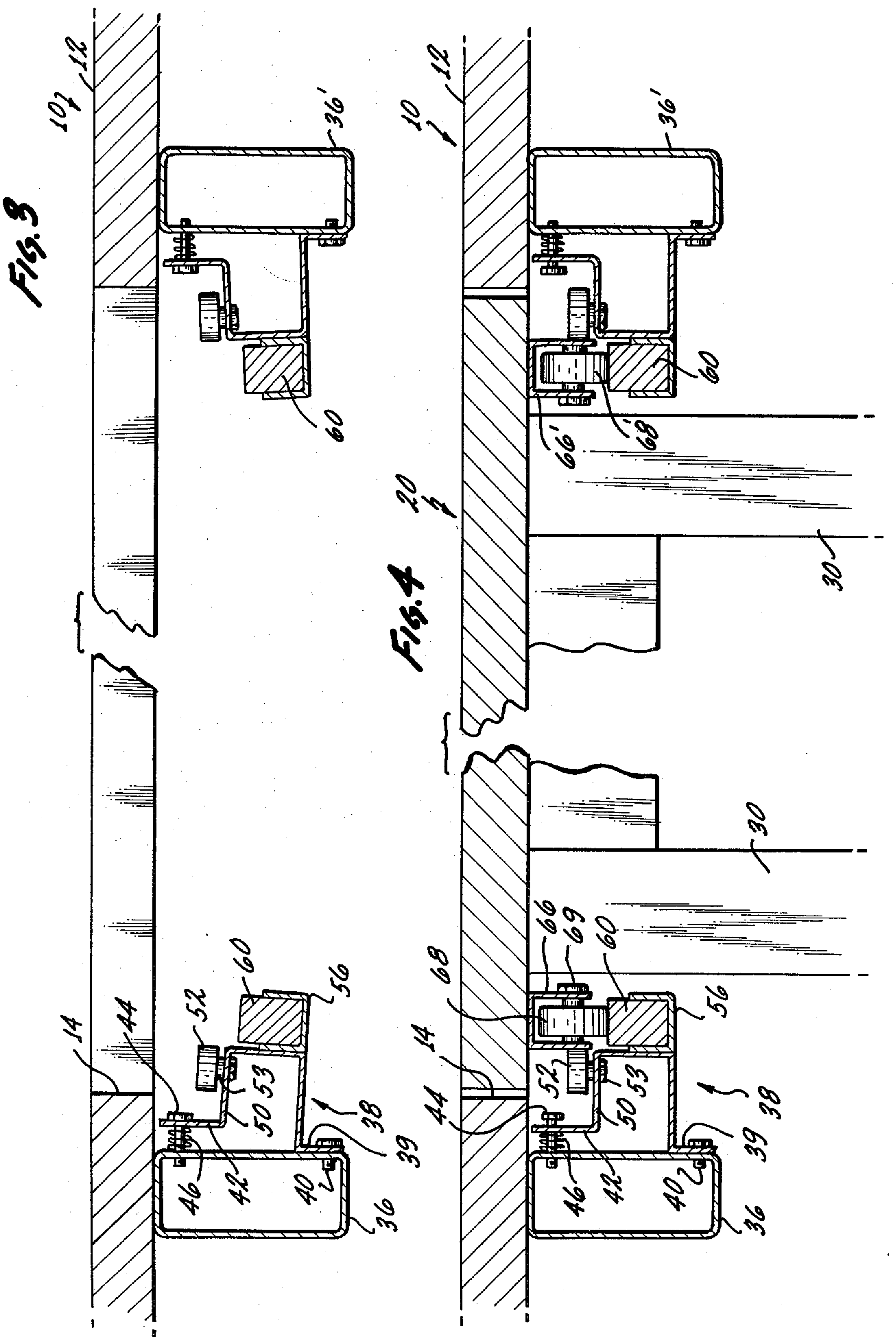
FIG. 3 is a sectional view taken through the bench and the guide means.
FIG. 4 is a sectional view similar to that of FIG. 3 showing the production cart in position relative to the fixed bench.

Referring to FIG. 4, numeral 66 designated a U-shaped channel member that is mounted underneath the top surface 21 of the production cart 20 adjacent to its left edge. Carried in this channel member is a series of rollers as designated at 68, the roller 68 being journalled on a bolt as designated at 69 extending between the side walls of the channel member 66. A similar guide track 66' and a series of rollers as shown at 68' are provided at the opposite side of the production cart 20.

FIGS. 5 and 6 illustrate the cooperation and the inter-engagement as between the production cart 20 and the fixed bench 10. The production cart is readily movable between work stations for the purpose of transferring parts being worked on from one fixed bench to another. The production cart can be moved into juxtaposition relative to the bench 10 as illustrated in FIG. 1. FIG. 5 illustrates the production cart 20 approaching the fixed bench 10. As it is moved inwardly into the cutout 14, the rollers as shown at 68 carried by the production cart engage the ramps as shown at 62 on the tracks 60 so that the cart is lifted by an amount such as to bring the top surface 21 of the production cart to the same level as the top surface 12 of the production bench 10. As the cart moves inwardly, its rollers 68 roll on the tracks 60. The outer sides of the U-channel members 66 come into engagement with the series of rollers as designated at 52 carried by the frame support members 38 as identified in the Figures. Referring to the channel member 66 as shown in FIG. 6, when it comes into engagement with the rollers 52, the frame member 38 can be rotated slightly as shown, the flange 42 moving towards the side wall of the frame member 36 compressing the coil springs 46. Thus, the engagement as between the rollers on the production cart 20 and those carried by the fixed bench 10 is snug, the bolts 44 being adjustable to accommodate the desired degree of snugness or fit. FIG. 6 shows the cart having been moved all the way into the cutout 14, the castor wheels 32 as may be seen having been lifted from the floor, the surfaces of the production cart and the workbench being at the same level, that is, flush with respect to each other.

From the foregoing, those skilled in the art will readily understand and appreciate the nature and construction of the invention and the manner in which the objects as set forth in the foregoing are realized. The construction is simplified but very sturdy and designed in a way to facilitate the realization of its purposes.

The foregoing disclosure is representative of a preferred form of the invention and is to be interpreted in an illustrative rather than a limiting sense, the invention to be accorded the full scope of the claims appended hereto.

I claim:

1. As an article of manufacture, the combination of elements including a work bench and a self-levelling wheeled cart, the work bench having a configuration shaped to receive the wheeled cart in close juxtaposed position thereto, with the bench and the wheeled cart having flat working surfaces, the work bench and the wheeled cart having inter-engaging means whereby when the wheeled cart is brought into juxtaposed position to the work bench, the said working surfaces are brought to the same level and the wheeled cart is stabilized in its juxtaposed position, the inter-engaging means including guide means carried by the bench, roller means carried by one of the elements and the guide means being constructed to have limited vertical moveability relative to the work bench resulting from engagement with the wheeled cart, the cart having means to engage the said guide means whereby to impart lifting movement to the guide means and to the cart to bring it to the level of the work bench.

2. An article as in claim 1, wherein said roller means are carried by the wheeled cart and are engageable with the guide means which in turn lift the cart to lift its wheels from the floor.

3. An article as in claim 2, the said guide means having ramps at one end, whereby the said roller means are operative to move up the ramps for lifting the wheeled cart.

4. An article as in claim 2 including guide rollers carried by the guide means, the wheeled cart having means engageable with the said guide rollers, the guide rollers being positioned whereby engagement by the cart means imparts lifting movement to the guide means.

5. An article as in claim 2, wherein said guide means includes guide ways there being wheel means positioned to provide for free relative movement, as between the wheeled cart and the work bench.

6. An article as in claim 5, wherein the guide means are in the form of guide tracks, the wheel means being carried by the cart and moveable on the guide tracks.

7. An article as in claim 6, including guide rollers carried by the guide means, the wheeled cart having means engageable with the said guide rollers.

8. An article as in claim 1, including means providing adjustability of the moveability of the guide means.

9. An article as in claim 1 wherein the guide means includes guide tracks and said roller means are on the wheeled cart and are engageable with the guide means.

10. As an article of manufacture, the combination of elements including a work bench and wheeled cart, the work bench having a configuration shaped to receive the wheeled cart in close juxtaposed position thereto, with the bench and the wheeled cart having flat working surfaces, the work bench and the wheeled cart having inter-engaging means whereby when the wheeled cart is brought into juxtaposed position to the work bench, the said working surfaces are brought to the same level and the wheeled cart is stabilized in a juxtaposed position, the inter-engaging means including guide means carried by the bench, said guide means being constructed to have limited vertical moveability resulting from engagement with the wheeled cart, the cart having means to engage the said guide means for imparting lifting movement to the cart, wheel means positioned to provide for free relative movement as between the wheeled cart and the work bench, the guide means being in the form of guide tracks, roller means being carried by the cart and moveable on the guide track, guide rollers carried by the guide means, the wheeled cart having means engagable with the said guide rollers, the said guide means including resilient means on which the guide rollers are mounted, whereby the guide rollers are caused to snugly engage the wheeled cart.

11. An article as in claim 10, including means for adjusting to degree of resiliency of the said resilient means.

12. An article as in claim 1, wherein the said guide means includes bracket members carrying guide tracks and carrying the said roller means, the bracket members being movable in a manner to lift the said guide tracks, the said cart having roller means engageable on the guide tracks, the first said roller means being positioned to be engaged by the said cart whereby to impart lifting movement to the said bracket members and the guide tracks.

13. An article as in claim 12, wherein the said bracket members are deformable in response to pressure exerted on said first roller means by engagement with the cart.

* * * * *